United States Patent [19]

Redemann

[11] 4,095,532
[45] Jun. 20, 1978

[54] WORKPLACE EQUIPMENT

[75] Inventor: Peter Redemann, Berlin, Germany

[73] Assignee: Schering Aktiengesellschaft, Berlin and Bergkamen, Germany

[21] Appl. No.: 667,117

[22] Filed: Mar. 15, 1976

[51] Int. Cl.² .............................................. A47B 37/00
[52] U.S. Cl. ..................................... 108/59; 108/109; 297/423
[58] Field of Search ................ 108/50, 109, 107, 159; 312/194, 195, 235 R; 297/172, 174, 423, 338

[56] References Cited

U.S. PATENT DOCUMENTS

| | | | |
|---|---|---|---|
| D. 183,576 | 9/1958 | McCarthy et al. | 312/194 X |
| 1,975,004 | 9/1934 | Jenkins | 312/195 |
| 2,107,404 | 2/1938 | Wilkin | 312/235 R |
| 2,427,832 | 9/1947 | Berger | 108/159 |
| 2,640,750 | 6/1953 | Rohde | 312/235 R |
| 2,821,450 | 1/1958 | Knoll | 312/195 |
| 3,007,708 | 11/1961 | Ochs | 108/107 X |
| 3,306,692 | 2/1967 | Timmerman | 312/235 R |
| 3,638,803 | 2/1972 | MacMillan | 108/159 |
| 3,650,586 | 3/1972 | Nightingale | 312/195 |

*Primary Examiner*—Francis K. Zugel
*Attorney, Agent, or Firm*—Millen & White

[57] ABSTRACT

To facilitate manual operations, especially in the pharmaceutical industry, there are provided for cooperation with a conveyor belt, particularly designed worktables, a service rack, and an adjustable table having an angle member.

2 Claims, 10 Drawing Figures

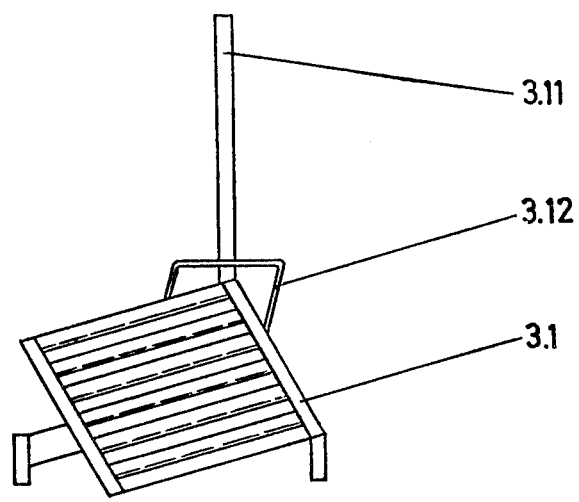
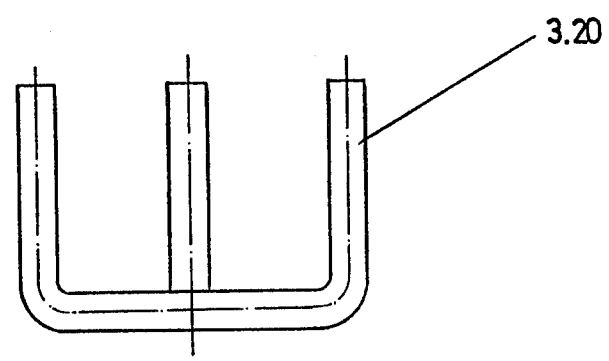
Fig. 3a

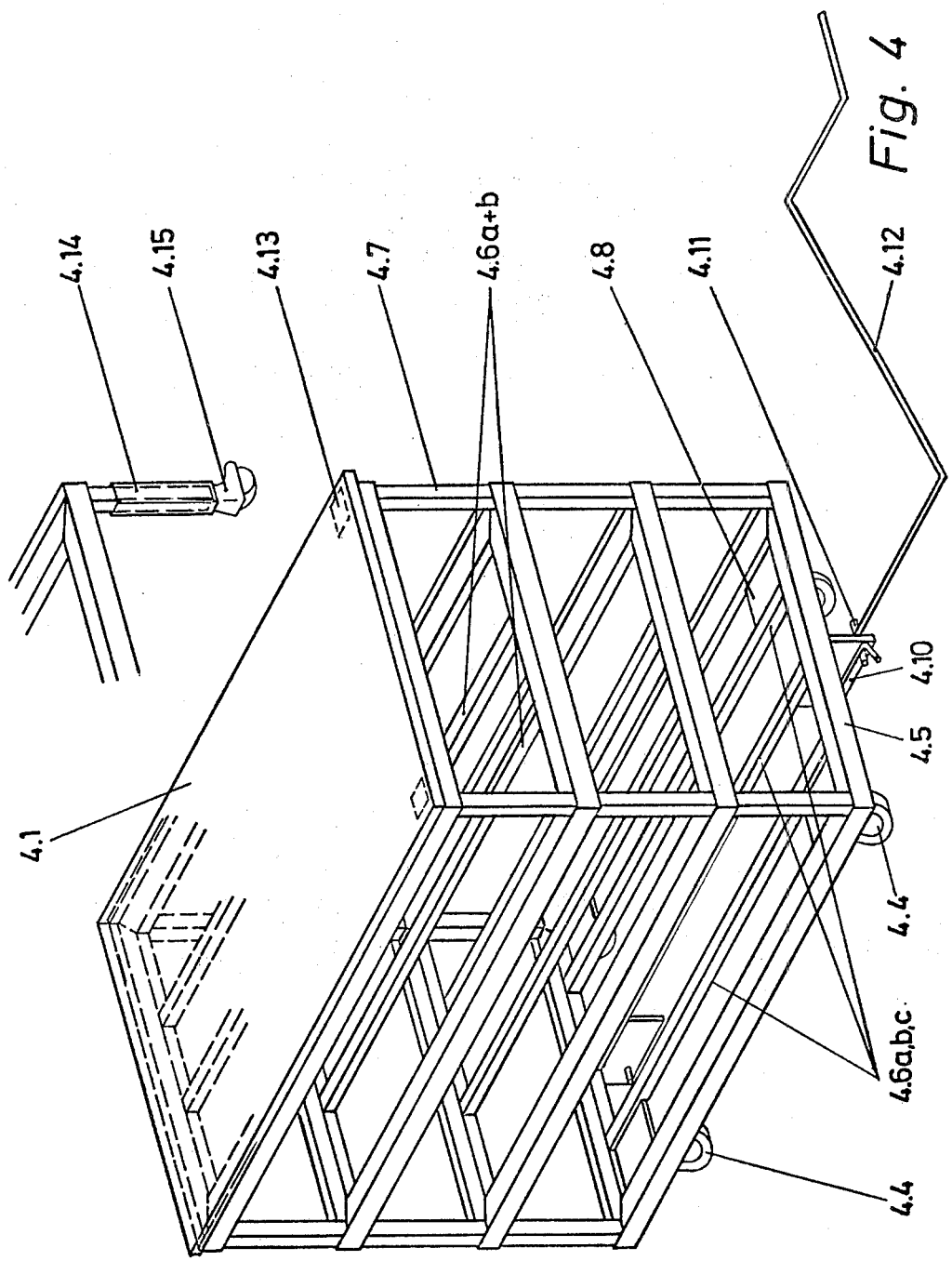

4,095,532

WORKPLACE EQUIPMENT

BACKGROUND OF THE INVENTION

The present invention relates to a workplace equipment, especially for manual working places in the industrial manufacture. This equipment comprises a worktable, a worktable for belt conveyors, an adjustable table with an angle plate, a service rack, and a chair, all of which can be utilized in unison or individually, depending on the requirements of the working process.

In the industry, workplaces are made available, in part, with the objective in mind of providing a maximally economical manufacturing procedure. However, the equipment of these workplaces is frequently designed without consideration of findings obtained in work physiology and work psychology, whereby the desired working efficiency could not be attained. In some branches of industry, as in the pharmaceutical industry, the basic rules of the World Health Organization demand a high quality of workplace equipment.

It is an object of the present invention to provide workplace equipment which fully satisfies the findings obtained in work physiology and work psychology and complies with legal requirements.

Upon further study of the specification and appended claims, further objects and advantages of this invention will become apparent to those skilled in the art.

SUMMARY OF THE INVENTION

One object of this invention is attained by providing that the workplace equipment comprises a worktable, a worktable for belt conveyors, an adjustable table with an angle plate, a service rack, and a chair.

The worktable comprises two end sections; the lower zone of these end sections comprises mounting rungs worked into these sections for a height-adjustable footrest. The two end sections are connected with each other by tubes, and the working surface is loosely laid thereon and held by means of stop blocks.

The worktable for belt conveyors comprises two end sections; in the lower zone of the latter, mounting rungs are provided for a vertically adjustable footrest. The two end sections are connected with each other by tubes. In the upper, stepped portion of the table there is arranged, beside the table plate held by stop blocks, a free space for receiving a conveying means. At the rearward longitudinal tube, a tripod is detachably mounted with a tripod head, the latter carrying by way of two parallel, movable rods, an angle plate having a form similar to a reading desk.

The adjustable table with the angle plate comprises a bottom frame, two end sections with receiving rungs for a vertically adjustable footrest, these sections being joined by tubes and carrying at the tips a guide bar receiving a top frame which is vertically adjustable by spacer elements. The top frame comprises an inverted pipe with a rectangularly attached frame with a table plate, wherein the latter can be erected optionally with the aid of a supporting rod, and a loose table angle plate can be clamped thereto at any desired height The service rack comprises a base frame which is made mobile by means of casters and is composed of a rectangular frame with an outwardly extended rim and three tubes in the longitudinal axis. A steering beam with a drawbar is attached to the middle tube. The service rack furthermore consists of an attachment which can consist of a frame and two tubes in the longitudinal direction and which can be composed of several independent attachments, for example three of them, and the rack further comprises a top panel with stop blocks.

The chair comprises a five-legged base with casters and a seat with a resiliently mounted backrest, wherein the seat/backrest combination is pivotably resilient in all directions.

Additional details of the invention will be explained and described in greater detail with reference to an embodiment, wherein reference is had to the appended drawings.

FIG. 3a shows the bottom frame of the adjustable table in a cross-sectional view, as well as the fixing clamp for the loose angle plate;

FIG. 4 shows the service rack, as well as a caster which can be attached;

DETAILED DESCRIPTION

Figure 1:
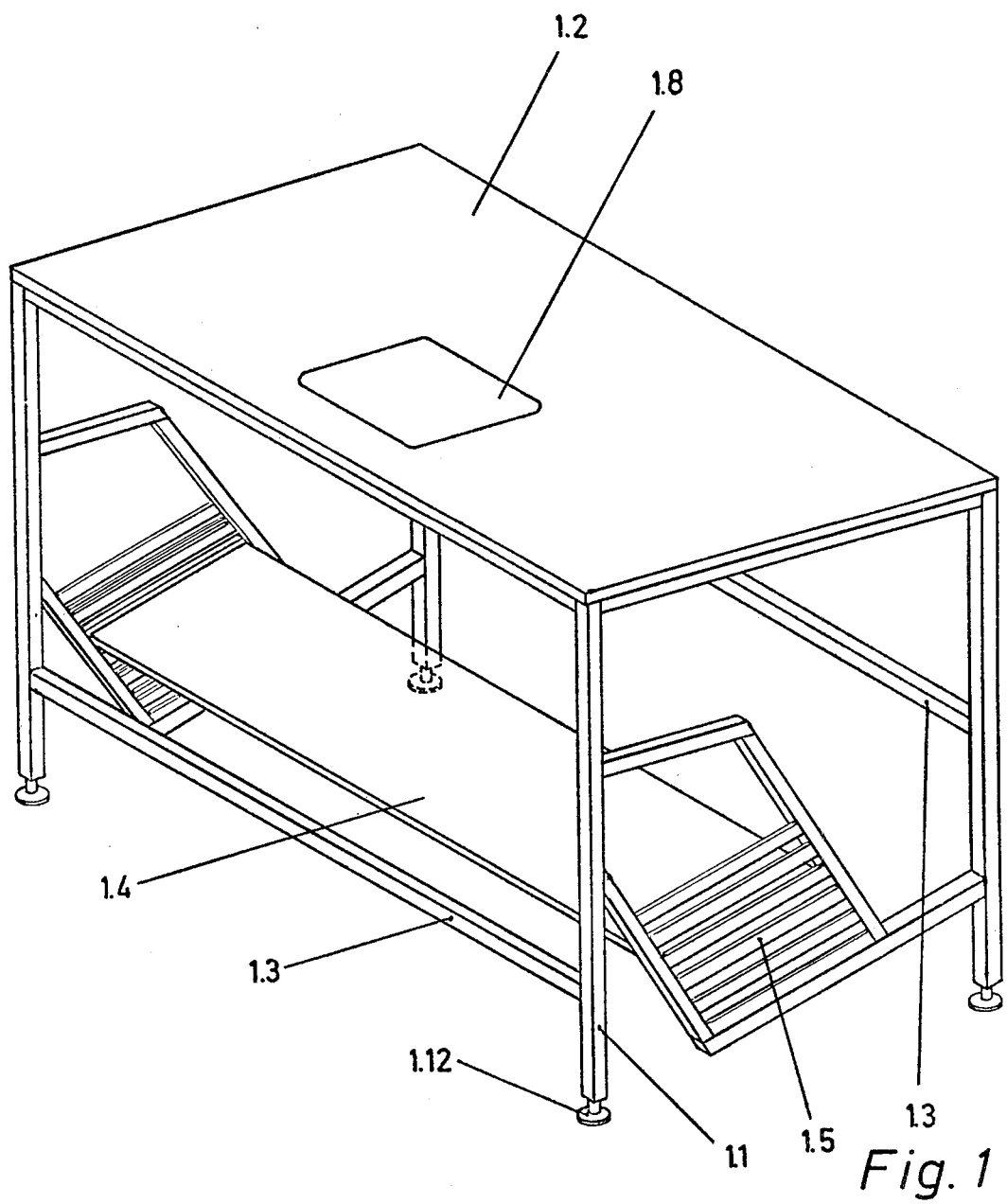
FIG. 1 shows a worktable in a perspective view.
Figure 1A:
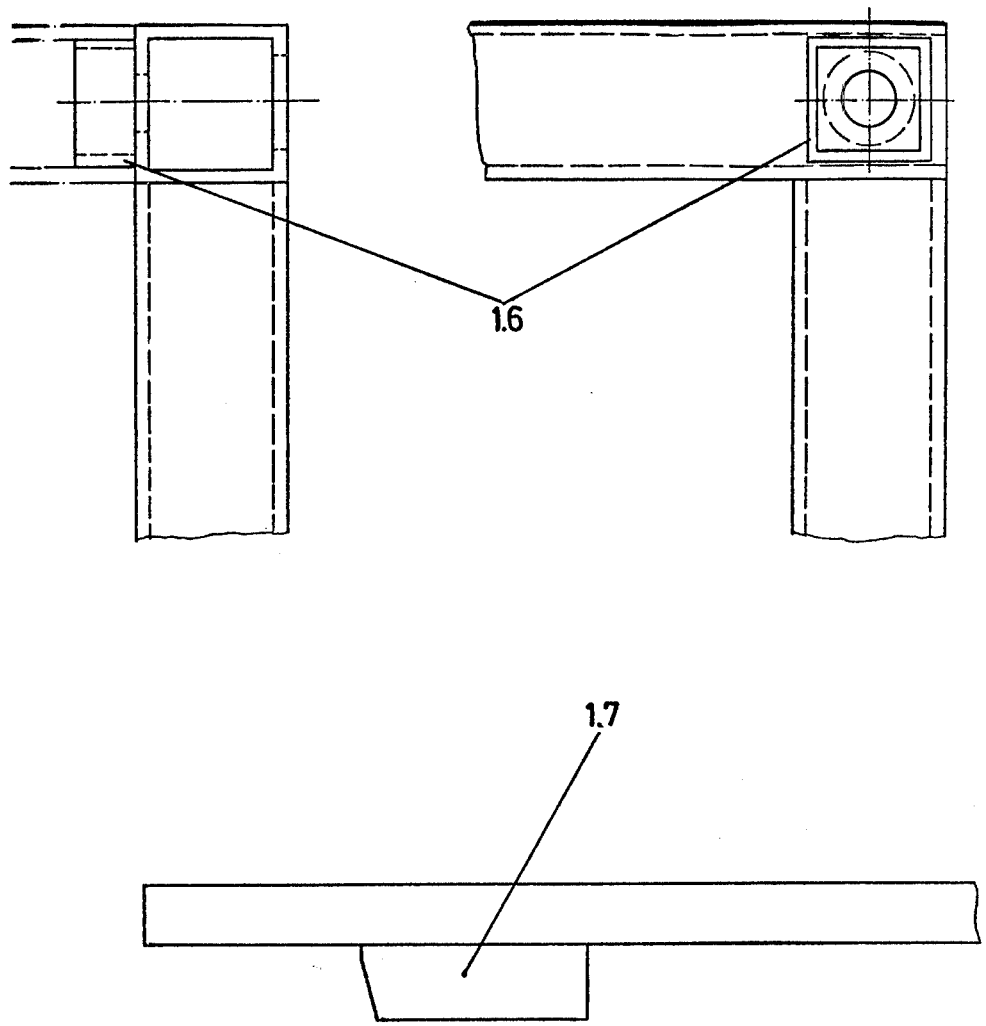
FIG. 1a shows the corner joints pertaining to the worktable and a stop [locking] block.

The worktable (FIG. 1) comprises two end sections 1.1; in the lower zone of the latter, mounting rungs 1.5 have been machined for the footrest 1.4 to place the latter in various vertically adjusted positions. The two end sections 1.1 are joined by tubes 1.3. The corner joints 1.6 are effected by screws (FIG. 1a).

A tabletop 1.2 is loosely laid on the mounted frame. The tabletop 1.2 is locked in place by means of stop blocks 1.7 (FIG. 1a). The surface of the tabletop has an area marked 1.8 centrally with respect to the length of the tabletop at a distance of about 100 mm. from the working edge. Levelling feet 1.12 are provided at the ends of the table feet.

Figure 2:
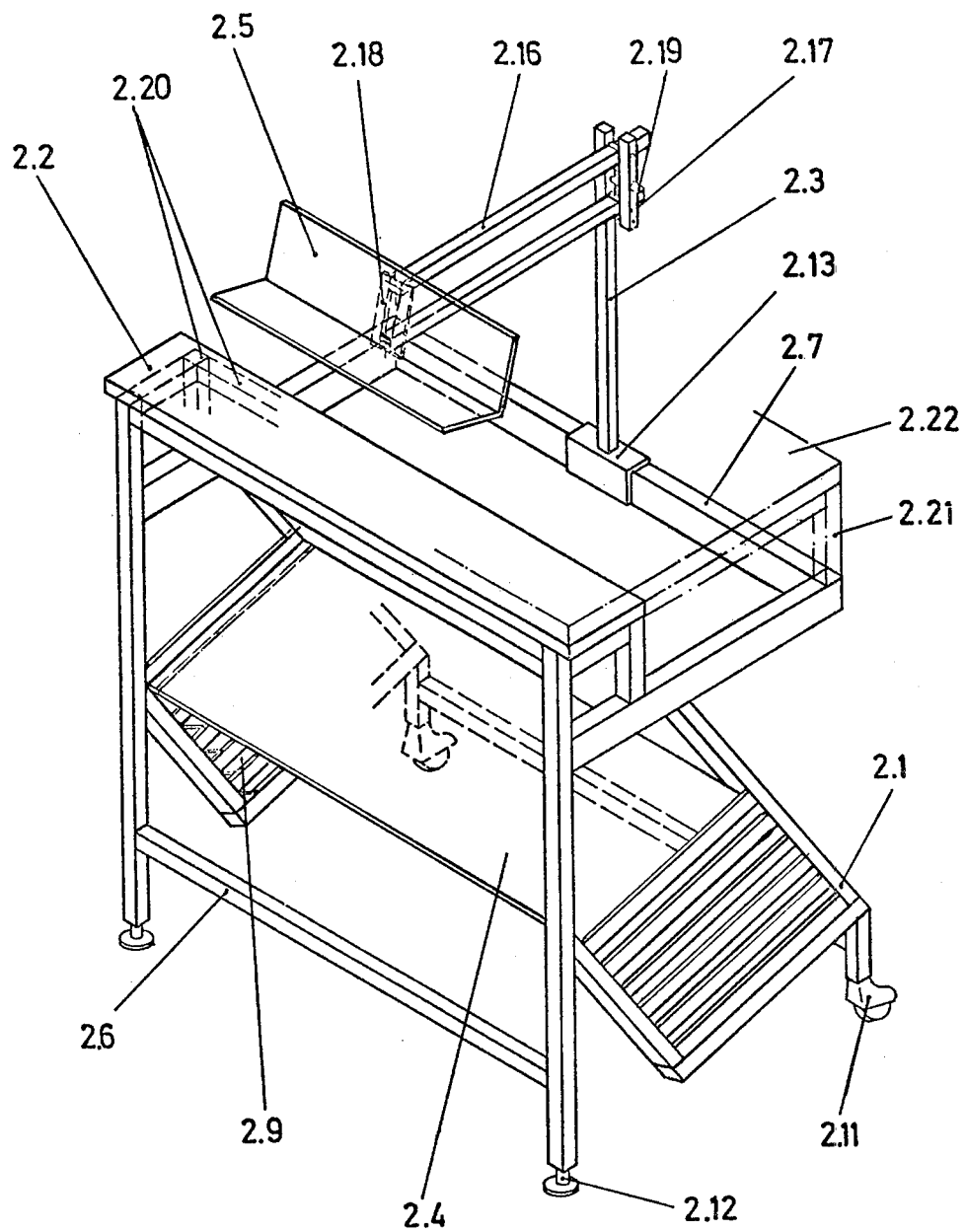
FIG. 2 shows a worktable for belt conveyors in a perspective view with the tripod angle plate attached thereto, wherein the working panel which can be placed on the structure in place of the tripod, if desired, is indicated.

The worktable for belt conveyors according to FIG. 2 comprises two end sections 2.1; in the lower zone of the latter, a mounting 2.9 has been provided for various vertical positions of the footrest 2.4. The top part contains a step comprising a tabletop 2.2; stop blocks 1.7 are attached to the underside of this tabletop, holding the latter form-fittingly between the tubes 2.20. In the free space of the steps, a conveying means can be inserted to supplement the fixed working plane. The frame feet facing away from the seating edge have lockable casters 2.11. The table feet on the seating edge have levelling feet 2.12.

The two end sections 2.1 are joined by means of tubes, such as 2.6 and 2.7. The corner joints are effected by screws as in 1.6.

Figure 2A:
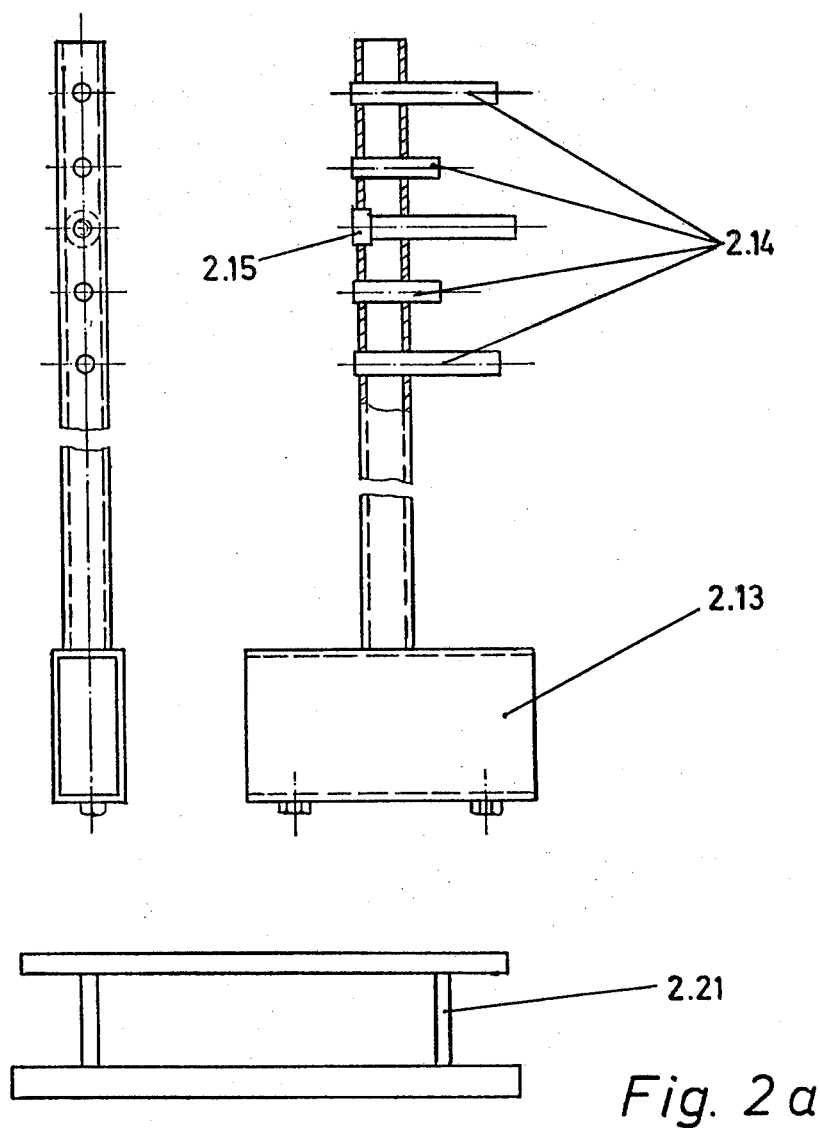
FIG. 2a shows details of the tripod, especially the tripod head and the framework with the working panel which can selectively be placed thereon.

A fixedly clampable tube 2.13 is pushed onto the rearward connecting tube 2.7. A tripod column 2.3 is attached to the former tube. The tripod column 2.3 is equipped at its head end with guide pins 2.14 (FIG. 2a) and a centrally located threaded pin 2.15 (FIG. 2a). In the guide pins 2.14, two square tubes 2.16 are slidingly movable, an angle plate 2.5 being mounted to one end of these tubes. A tubular traverse 2.17 is placed over the guide pins 2.14 and the threaded pin 2.15 of the thus-formed tripod head, when the angle rods 2.16 are inserted. The ends of the angle rods 2.16 are rotatably mounted to the angle plate 2.5 with two angle sheets 2.18. By way of a handwheel 2.19, serving as the nut, the traverse 2.17 is pressed onto the angular rods 2.16, thus fixing the parallelogram consisting of rods 2.16, angle member 2.5, and tripod head.

The tripod system 2.13, 2.3–2.5 can be exchanged for a structure 2.21 (FIG. 2a) bridging the table gap between the planes of the tube 2.7 and the tubes 2.20. This structure 2.21 comprises four tubes connected with one another in the manner of a ladder and makes it possible to mount the tabletop 2.22.

The adjustable table with the angle member comprises a bottom frame, a top section with a spacer element 3.4, and a loose angle member 3.7.

Figure 3:
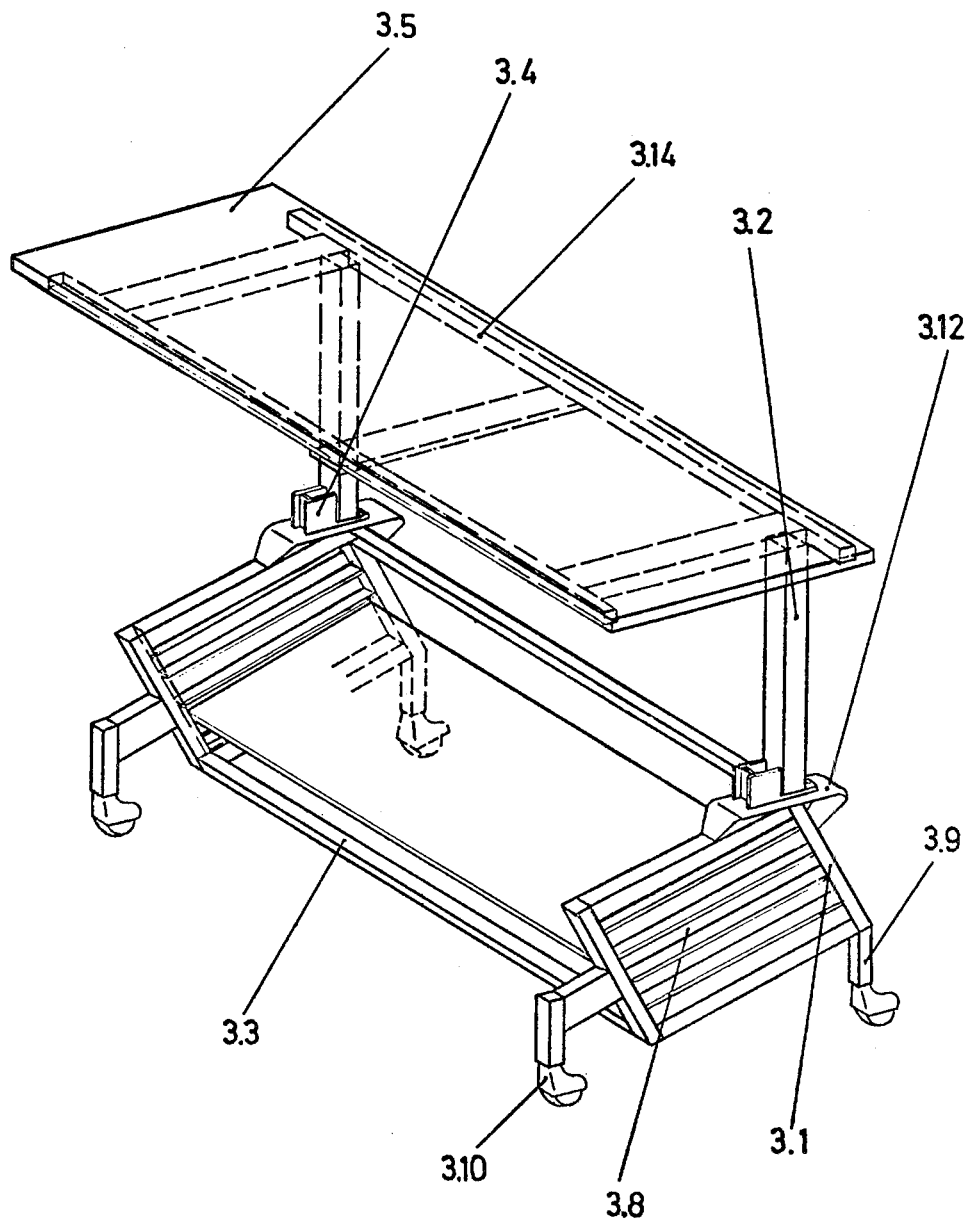
FIG. 3 shows an adjustable table with an angle plate in a perspective view.

The bottom frame (FIG. 3a) is composed of two end sections 3.1. Each end section 3.1 is formed from the mounting of the vertically adjustable footrest 3.8 to which are attached respectively two feet 3.9 with lockable casters 3.10 and a guide rod 3.11. The mounting 3.8 and the guide rod 3.11 are joined by a bracket 3.12. Both end sections 3.1 are combined by means of tubes 3.3.

Respectively one spacer element 3.4 is placed over the guide rods 3.11. The spacer element 3.4 permits the vertical adjustment of the top part, wherein it is horizontally shifted on the guide rod 3.11 in one direction while lying on the bracket 3.12.

By displacing the spacer element 3.4 into the bearing zone of the inverted tubes 3.2 of the top part, the latter is elevated by this distance. Thus, the adjustable table with its tabletop 3.5 can be moved into the working zone of the worktable 1 (FIG. 1).

The top part consists of two insert tubes 3.2 placed over the guide rods 3.11 of the bottom frame. The insert tubes 3.2 are joined with each other by a square tube frame 3.14. The tabletop 3.5 rests on the tube frame.

Figure 3B:
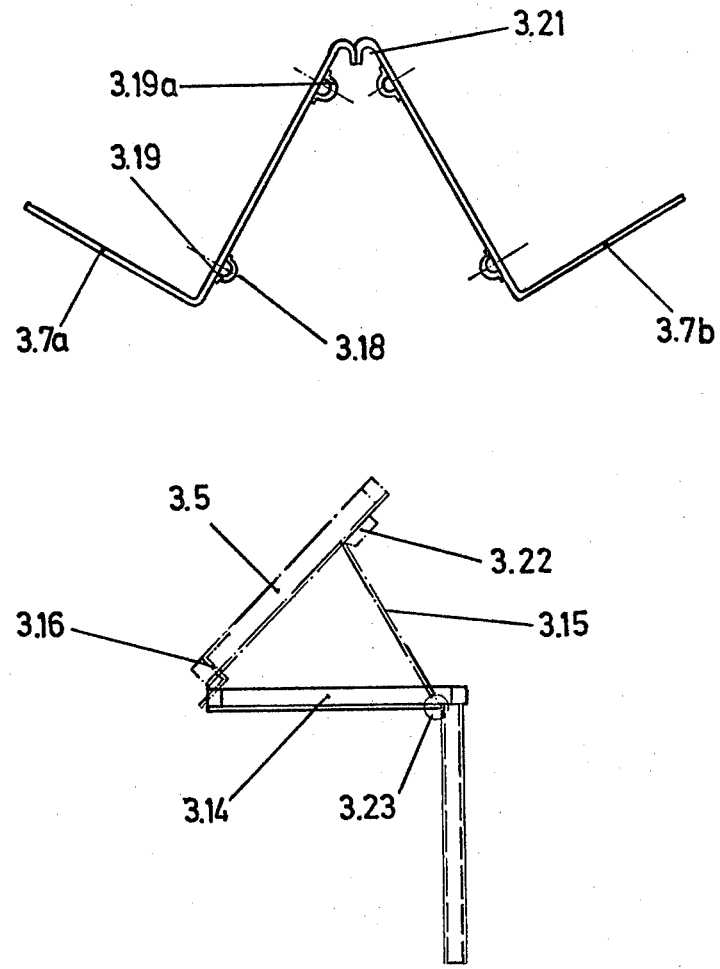
FIG. 3b shows the loose angle plate in the unfolded position, as well as the top frame of the adjustable table, wherein the adjusted [inclined] position of the working panel [top] is indicated.

The tabletop 3.5 can be held by way of a supporting rod 3.15 (FIG. 3b) on a longitudinal side of the frame and can be brought, on the other longitudinal side of the tube frame 3.14, into variable inclined positions and fixed therein by means of two Z-angles 3.16 serving as the hinge. The supporting rod 3.15 is rotatable about the hinge element 3.23 at the tube frame 3.14. The locking block 3.22 at the tabletop 3.5 serves for fixing the inclined tabletop 3.5 in its position.

The loose angle plate 3.7 (FIG. 3b) comprises two equally long sheet-metal angle halves 3.7a and 3.7b which together attain the length of the tabletop 3.5. The central dividing seam is joined form-fittingly by two cylindrical pins 3.18 mounted in shackles 3.19 attached on each angle half 3.7a and 3.7b. The thus-composed angle plate 3.7 comprises, at the two upper outer sides at the level of the top shackle 3.19 of the central dividing seam, likewise a shackle 3.19a of the same dimensions. Clamps with three teeth and denoted by 3.20 (FIG. 3a) can be inserted in these shackles 3.19a. The angle plate 3.7 can be clamped to the inclined tabletop 3.5 in any desired height position by means of this clamp 3.20. If both angle halves 3.7a and 3.7b are disassembled and placed against each other with the upper folded border 3.21, a bilateral angle of half the table length is obtained. The three-toothed clamp 3.20 is inserted in the upper shackles 3.19a of both angle halves 3.7a and 3.7b and thus prevents the spreading apart of the angle plate 3.7.

The service rack (FIG. 4) comprises a movable base frame, an attachment, and the top panel 4.1 as well as the insertable casters 4.14 and 4.15.

The base frame consists of a rectangular frame 4.5 made of rectangular tubing with an elevated rim, wherein the latter delimits the outside of the frame.

Three square tubes 4.6a, b, c are inserted in this frame 4.5 in the longitudinal axis. The two square pipes 4.6a and 4.6c define, on the outside, the base panels 4.8 to which the fixable casters 4.4 are attached. The central pipe 4.6c carries the steering beams 4.10. The steering beam 4.10 is provided with a bilaterally projecting pin 4.11 on which rests a drawbar 4.12 making it possible to steer the base frame accurately in a desired direction.

The frame 4.5 of the attachment comprises the same material and has the same dimensions as the base frame. In contrast to the latter, however, it has only two central tubes 4.6a and 4.6b arranged in the longitudinal axis. The frame has four feet 4.7 of square tubing. The feet of one attachment can be inserted in the respectively lower-disposed attachment into the base frame or into the insertable casters 4.4. The attachment is preferably used in the form of three separate attachments with central tubes 4.6a and 4.6b.

The top panel 4.1 can be loosely placed on the base frame and/or on the attachment and is secured from sliding off by means of locking elements 4.13.

The insertable casters 4.4 consist of a square pipe 4.14, one end of which carries a fixable guide roller 4.15. The open pipe end can be placed over a foot 4.7 of the attachment.

Figure 5:
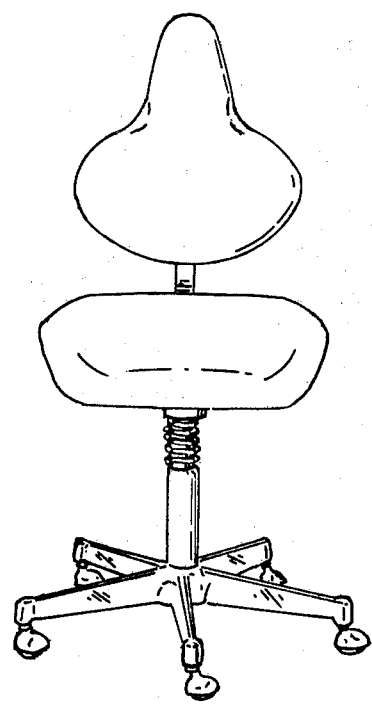
FIG. 5 shows a front view of the chair.

The chair (FIG. 5) as used in the workplace equipment according to this invention is a model known per se. This chair consists of a base frame with five arms each of which carries a pivoting roller. The seat is shaped anatomically. This seat is connected to a backrest permitting a large free space for motion during use, even if the person sitting on the chair leans against the backrest.

The seat is pivotably resilient, together with the backrest, toward all directions.

The individual parts of the workplace equipment of this invention have, in particular, the following functions:

The worktable (FIG. 1) serves as a stationary working zone for manipulations such as, for example, the composing of individual parts or for rearranging.

The worktable for belt conveyors (FIG. 2) is intended as a fixed working zone for manipulations on mechanical conveyor stations, such as belt conveyors or roller chains. This table can be introduced underneath a belt conveyor at any desired location.

The associated tripod angle member (FIG. 2a) can be moved vertically within the limits of the parallelogram toward the front or rear, upwardly or downwardly, wherein the inclination of the angle plate is likewise movable.

By means of the attachment frame 2.21, which can be attached in place of the tripod angle, a worktable is obtained which fits in its dimensions to all other parts of the workplace equipment according to the present invention.

The adjustable table with angle plate (FIG. 3) supplements the fixed working zone of the worktable (FIG. 1) when the tabletop is horizontal and has been lowered. With an obliquely adjusted working top with the top part being elevated and the loose angle plate clamped in position, the material to be worked on can be moved toward the personnel and away from the personnel over the worktable panel.

The loose angle member 3.7 can be utilized with half its length and with bilateral extension separately from the ajustable table at any worktable top.

The service rack can be used without the top panel 4.1 as well as with this top panel 4.1.

When used without the panel 4.1, the rack serves as transport vessel for the conveyance of packaging components from and to the working station, as a storage container at the working place, for the supply of individual parts during the assembly of packaged units in the working zone of the collaborator, for receiving auxiliary devices and for making possibilities available for using the latter during changing working locations in the working zone of the collaborator.

When used with the panel 4.1, the latter serves as an extension for the worktable with simultaneous utilization of the space underneath the panel for storage; the panel represents the worktable extension and the conveying means, and the service rack serves as vertically adjustable stand during fixed and mobile use at any site of the manufacturing process.

Figure 6:
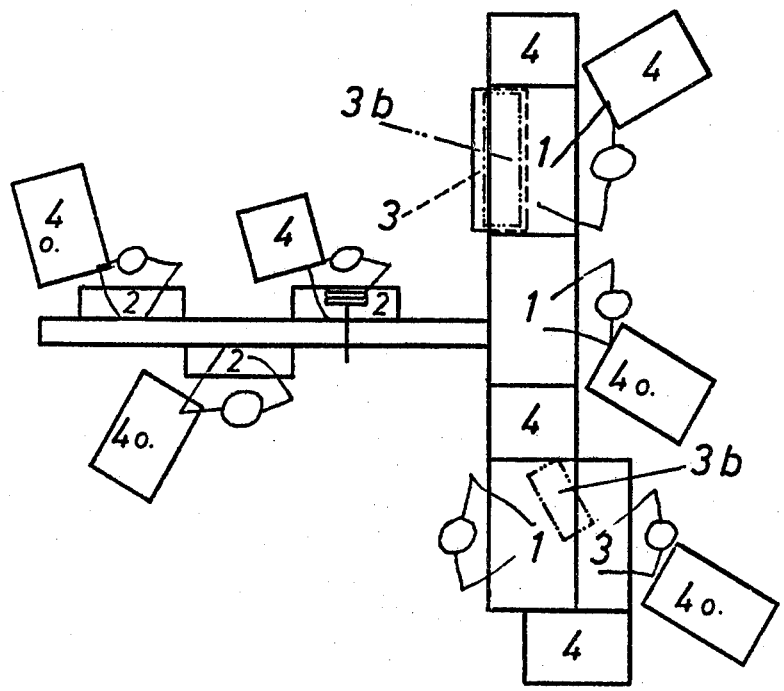
FIG. 6 shows the use of the workplace equipment of this invention in connection with the example of a final stage in the packaging process for small components.

FIG. 6 shows as an example how the individual parts of the workplace equipment can be utilized in combination.

By way of the conveyor belt, ampoules are fed to the working stations at the tables for belt conveyors 2. These ampoules are here provided with further packaging components and returned to the belt. To present the parts, one-tier and/or two-tier service racks 4, with and without a panel 4.1 placed thereon, are located beside these stations.

From the belt, the preliminarily assembled units pass to the worktable 1. Here, they are further completed with the aid of packaging components made available at the worktable 1 with the adjustable table 3 with inclined table top 3.5 and attached angle plate 3.7 being pushed thereunder. The angle member 3.7 as well as the two service racks 4 serve for storing components so that they are readily accessible during the manufacturing process. The preliminarily assembled units then move via a service rack 4 with panel 4.1 as the buffer means to the worktable 1 with an adjustable table 3 placed thereagainst. The preassembled units are here packed into cartons. The loose angle member 3.7 standing on the tabletop 1.2 serves for presenting the parts so that they can be readily seized. The units, once packaged into cartons, are placed on the lateral service rack 4 and moved to the pallet.

The workplace equipment of this invention is tailored especially for the needs of the pharmaceutical industry without being limited thereto. The workplace equipment in accordance with this invention prevents, in pharmaceutical final-stage manufacturing plants, in a simple manner any contaminations, erroneous interchanging, and/or intermixing according to the basic rules of the World Health Organization (WHO) for the production of medicinal agents and safeguards the quality of the products as also set out in the new version of the German drug law.

None of the parts of the workplace equipment of this invention show, in the assembled condition, any open pipe locations or threads. The parts closing off the tubes can be detached in the disassembled condition. Thereby, the components can, if necessary, be cleaned off in the internal spaces of the profiles in accordance with the material. Due to the fact that the equipment can be disassembled, all of the individual components can be advantageously cleaned in correspondence with the respective peculiarity of the material. The workplace equipment of this invention permits a minimum movement of material for the prevention of contaminations, erroneous interchanges, and intermixing. The equipment is constructed so that it can be rapidly adapted without modifications to varying manufacturing procedures in order to attain an increased safety for the preparations. Cleaning devices can easily be inserted underneath the fixed parts, such as the worktable, for example, and mobile components, such as the service rack, can easily be removed from the group of furniture for janitorial cleaning purposes.

All of the parts can be disassembled, stacked, and placed on pallets.

At all tables of the workplace equipment, it is possible to selectively be in a seated or standing position under ergonomically identical conditions, so that starting with the work in progress and the motion elements derivable therefrom, the workplace equipment is optimally constructed according to the REFA tables of anthropometry for 95% of all women living in the Federal Republic of Germany. In the workplace equipment according to this invention, the measurement ratios of the human body, the economical utilization of the muscle power, the visual power, and also psychological viewpoints for arranging a working place, such as, for example, the rules of motion economy, have been taken into account.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A worktable consisting essentially of:
   two identical end sections, each of said end sections composed of two vertical legs of equal heights and a first tubular crossmember, attached to the tops of each of said legs and being perpendicular to each of said legs, said end sections being separated from each other along a line perpendicular to each of said first crossmembers such that said crossmembers are parallel to each other;
   leg height adjustment means at the bottom of each of said legs;
   a pair of equal length tubular crossmembers, each connecting the top of one leg of one of said end sections to the top of one leg of the other end section, said second crossmembers being disposed parallel to each other and perpendicular to said first tubular crossmembers;
   a pair of third tubular crossmembers, each located under and parallel to one of said second crossmembers, one of said third crossmembers connecting the lower regions of the legs to which its overlying second crossmember is attached; and the other of said third crossmembers connecting the middle regions of the legs to which its overlying second crossmember is attached; each of said third crossmembers being of a length equal to that of said second tubular crossmembers and greater than the length of said first crossmembers;

a pair of first tubular rods each disposed parallel to and under one of said first crossmembers, each of said first tubular rods being attached at the same height to the lower region of one of said legs which are connected at their middle regions by one of said third crossmembers, each of said first tubular rods being of a length shorter than said first crossmembers, and each of said first tubular rods extending beyond the midpoint between the legs in each of said end sections;

a pair of second tubular rods disposed parallel to and under each of said first crossmembers, each of said second tubular rods being attached at the same height to the upper region of one of said legs which are connected at their lower regions by one of said third crossmembers, each of said second tubular rods terminating before the midpoint between the legs in each of said end sections;

a pair of third tubular rods, each connecting the non-leg engaging end of one of said second tubular rods to the top of said first tubular rod in the end section of said second tubular rod, the connection at the top of said first tubular rod being at a point between said midpoint and the leg to which said first tubular rod is connected;

a pair of fourth tubular rods, each connecting the non-leg engaging end of one of said first tubular rods to the inner side of a leg in the same end section as said first tubular rod, said leg being the one to which said first tubular rod is not attached, the connection at said leg being at a point below that at which said second tubular rod is attached and in the middle region of said leg, said third and fourth tubular rods in each end section being disposed parallel to each other;

a plurality of rungs in each end section disposed parallel to said first crossmembers and one above the other, each of said rungs being connected at one end to the third tubular rod in the end section and at its other end to the fourth tubular rod in the end section, said rungs being vertically spaced from each other to provide slots in each end section for insertion of one end of a footrest surface;

a rectangular footrest surface whose longer ends are substantially equal in length to the distance between said end sections and whose shorter ends are substantially equal in width to the distance between the third and fourth tubular crossmembers in each end section, each of said shorter ends of said footrest surface lying on one of said rungs in one of said end sections, the two supporting rungs being of equal height;

a work surface of length substantially equal to the distance between said end sections and of width substantially equal to the distance between the legs in each end section, said work surface loosely disposed on top of said end sections and said pair of second crossmembers;

four stop-blocks attached to the underside of said work surface, said stop-blocks being positioned on said work surface so that when said work surface is disposed on top of said end sections and second crossmembers, each of said four stop-blocks engages one of the four corners defined by the connections of said first crossmembers to said second crossmembers, thereby fixing the position of said work surface; and a marked area on the top of said work surface, the center of said marked area being located centrally between said end sections, the marked area being composed of a quadrilateral figure, each of the four lines of said marked area being parallel to one of the edges of said work surface, one of said lines which is parallel to the longer edges of said work surface being located about 100mm from one longer edge, the other of said lines which is parallel to the longer edges of said work surface being located in the middle region of said work surface, and each of the remaining two lines joining one pair of edges of said two lines which are parallel to the longer edges of the work surface.

2. A method of carrying out pharmaceutical operations which comprises performing said operations in a work area in which the working surface is provided by the worktable of claim 1.

* * * * *